US012124805B2

(12) United States Patent
Pargunarajan et al.

(10) Patent No.: US 12,124,805 B2
(45) Date of Patent: Oct. 22, 2024

(54) DATA INGESTION USING ARTIFICIAL INTELLIGENCE AND MACHINE LEARNING

(71) Applicant: Accenture Global Solutions Limited, Dublin (IE)

(72) Inventors: Sureshkumar Pargunarajan, Chennai (IN); Haripriya Srinivasan, Thanjavur (IN); Tharani Dhanasekaran, Coimbatore (IN); Arunselvan Sivamani, Chennai (IN); Aravind Raja M Balasubramanian, Chennai (IN); Arun Sundararaman, Chennai (IN); Uday Kumar Ramamoorthy, Chengam (IN)

(73) Assignee: Accenture Global Solutions Limited, Dublin (IE)

(*) Notice: Subject to any disclaimer, the term of this patent is extended or adjusted under 35 U.S.C. 154(b) by 945 days.

(21) Appl. No.: 16/908,051

(22) Filed: Jun. 22, 2020

(65) Prior Publication Data
US 2021/0398024 A1    Dec. 23, 2021

(51) Int. Cl.
*G06F 16/30*    (2019.01)
*G06F 16/25*    (2019.01)
*G06F 40/30*    (2020.01)

(52) U.S. Cl.
CPC .......... *G06F 40/30* (2020.01); *G06F 16/258* (2019.01)

(58) Field of Classification Search
CPC .................................................. G06F 16/258
See application file for complete search history.

(56) References Cited

U.S. PATENT DOCUMENTS

| 9,529,863 B1* | 12/2016 | Gindin ................. G06Q 40/00 |
| 10,586,280 B2 | 3/2020 | McKenna et al. |
| 2020/0380212 A1* | 12/2020 | Butler ................. G06F 16/908 |
| 2020/0394225 A1* | 12/2020 | Nair ..................... G06N 20/00 |
| 2021/0342640 A1* | 11/2021 | Patten, Jr. .......... G06F 18/2148 |
| 2021/0350167 A1* | 11/2021 | Wray ............... G06F 16/90335 |

FOREIGN PATENT DOCUMENTS

WO    2019227062 A1    11/2019

* cited by examiner

*Primary Examiner* — Khanh B Pham
(74) *Attorney, Agent, or Firm* — Polsinelli PC

(57) ABSTRACT

A device may receive a data input that is associated with an event. The device may parse the data input to identify an input value that is associated with the event. The device may determine a probability that the input value corresponds to a feature of the event based on a configuration of the input value. The device may classify the input value as being associated with an element of the event based on the probability. The device may determine a rule profile of the input value based on the feature and the element. The device may determine a profile score associated with the data input based on the rule profile. The device may ingest, based on the profile score, the data input into a data structure. The device may determine a validation score based on a random factorization analysis of the rule profile and the input value.

20 Claims, 7 Drawing Sheets

DATA INGESTION USING ARTIFICIAL INTELLIGENCE AND MACHINE LEARNING

BACKGROUND

Data ingestion may refer to a process of obtaining and importing data for immediate use or storage in a database. The ingested data may be accessed, used, and analyzed by a system ingesting the data.

SUMMARY

In some implementations, a method includes receiving, by a device and from a source device, a data input that is associated with an event that is associated with the source device; parsing, by the device, the data input to identify an input value that is associated with the event; determining, by the device and using a first model, a probability that the input value corresponds to a feature of the event based on a configuration of the input value; classifying, by the device and using the first model, the input value as being associated with an element of the event based on the probability; determining, by the device and using the first model, a rule profile of the input value based on the feature and the element; determining, by the device and using a second model, a profile score associated with the data input based on the feature, the element, and the rule profile; ingesting, by the device and based on the profile score satisfying a threshold profile score, the data input into a data structure associated with an entity involved in the event; determining, by the device and based on ingesting the input data, a validation score of the data input based on a random factorization analysis of the rule profile and the input value; and performing, by the device and based on the validation score, an action associated with the data input and the entity.

In some implementations, a non-transitory computer-readable medium storing instructions includes one or more instructions that, when executed by one or more processors of a device, cause the device to: receive a data input that is associated with an event; parse the data input to identify an input value that is associated with the event; determine a probability that the input value corresponds to a feature of the event based on a configuration of the input value; classify the input value as being associated with an element of the event based on the probability; determine a rule profile of the input value based on the feature and the element; determine, using a data analysis model, a profile score associated with the data input based on the feature, the element, and the rule profile, wherein the data analysis model is trained to validate data inputs based on historical data inputs and historical information associated with features of input values of the historical data inputs; and perform, based on the profile score, an action associated with the input value and the data input.

In some implementations, a device includes one or more memories; and one or more processors, communicatively coupled to the one or more memories, configured to: parse a data input to identify input values that are associated with an event; determine, using a first model, feature information that is associated with elements of the event, wherein the feature information is trained based on historical input value configurations and historical features that are associated with the historical input value configurations; determine, using a second model, a profile score associated with the data input based on the feature information, wherein the profile score is associated with a quality of the data input according to the second model, and wherein the second model is trained based on historical data inputs and historical information associated with features of input values of the historical data inputs; and perform, based on the profile score, an action associated with the data input.

DETAILED DESCRIPTION

Figure 1A:
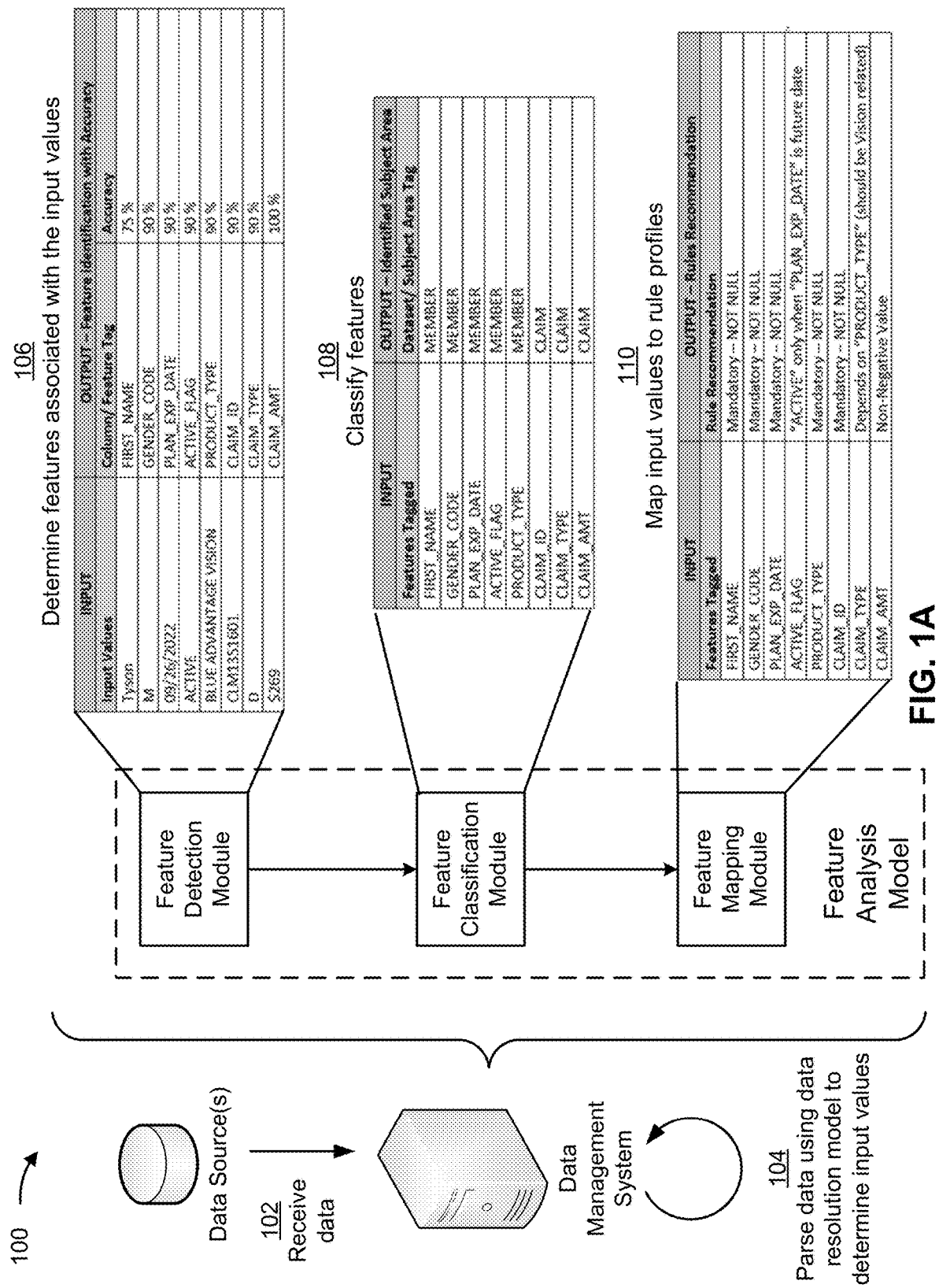
FIGS. 1A-1C are diagrams of an example implementation described herein.

The following detailed description of example implementations refers to the accompanying drawings. The same reference numbers in different drawings may identify the same or similar elements.

In many industries (e.g., the healthcare industry), data is received from various data sources, each of which, generate and/or provide the data in various formats, using various protocols, and/or the like. Furthermore, the data sources and/or formats may frequently change, be updated, and/or the like. Accordingly, a data ingestion platform needs to be correspondingly configured to receive data in a wide variety of formats so that the data can be properly analyzed, processed, stored, and/or displayed for further analysis (e.g., by a user).

As an example, in the health care industry, a health insurance provider can receive data in multiple different formats based on the data being generated by different types of machines and/or based on the data being received from multiple different sources. For example, the health insurance provider may receive data input by a medical professional (e.g., a doctor, a nurse, and/or the like) via an application executing on a mobile device (e.g., a tablet, a smartphone, and/or the like) in a first format and may receive data from a medical device (e.g., an x-ray machine, an MIll machine, and/or the like) in a second different, format. Because the data obtained by the health insurance provider is in multiple different formats, the health insurance provider may not be able to use an automated process to analyze the data, may be required to utilize multiple, separate processes to analyze data based on a format of the data, and/or the like. Thus, the health insurance provider may expend a significant amount of time, human resources, and computing resources (e.g., processing resources, memory resources, communication resources, and/or the like) to analyze the data. Further, by utilizing the multiple, separate processes to analyze the data, the health insurance provider may not be able to determine relationships between data obtained from different sources, trends in the data, and/or the like.

Some implementations described herein relate to a data management system that is configured to ingest and process multiple types of data received from multiple types of devices. For example, the data management system may utilize machine learning to determine features associated with the data based on a format of the data. The data management system may determine a subject area of the data based on the features. The data management system may determine relationships and dependencies between the features and may determine rules for converting the data into a consumable format (e.g., a common format, a format that enables the data management system to analyze the data, and/or the like). The data management system may process the data based on the rules to convert the data into a consumable format.

By converting multiple types of data from multiple types of devices into the consumable format, the data management system may reduce the time and resources (e.g., human resources, computing resources, and/or the like) required to analyze the data. Further, the consumable format may the data to be analyzed via a common process thereby allowing relationships, dependencies, trends, and/or the like to be easily identified.

Figure 1B:
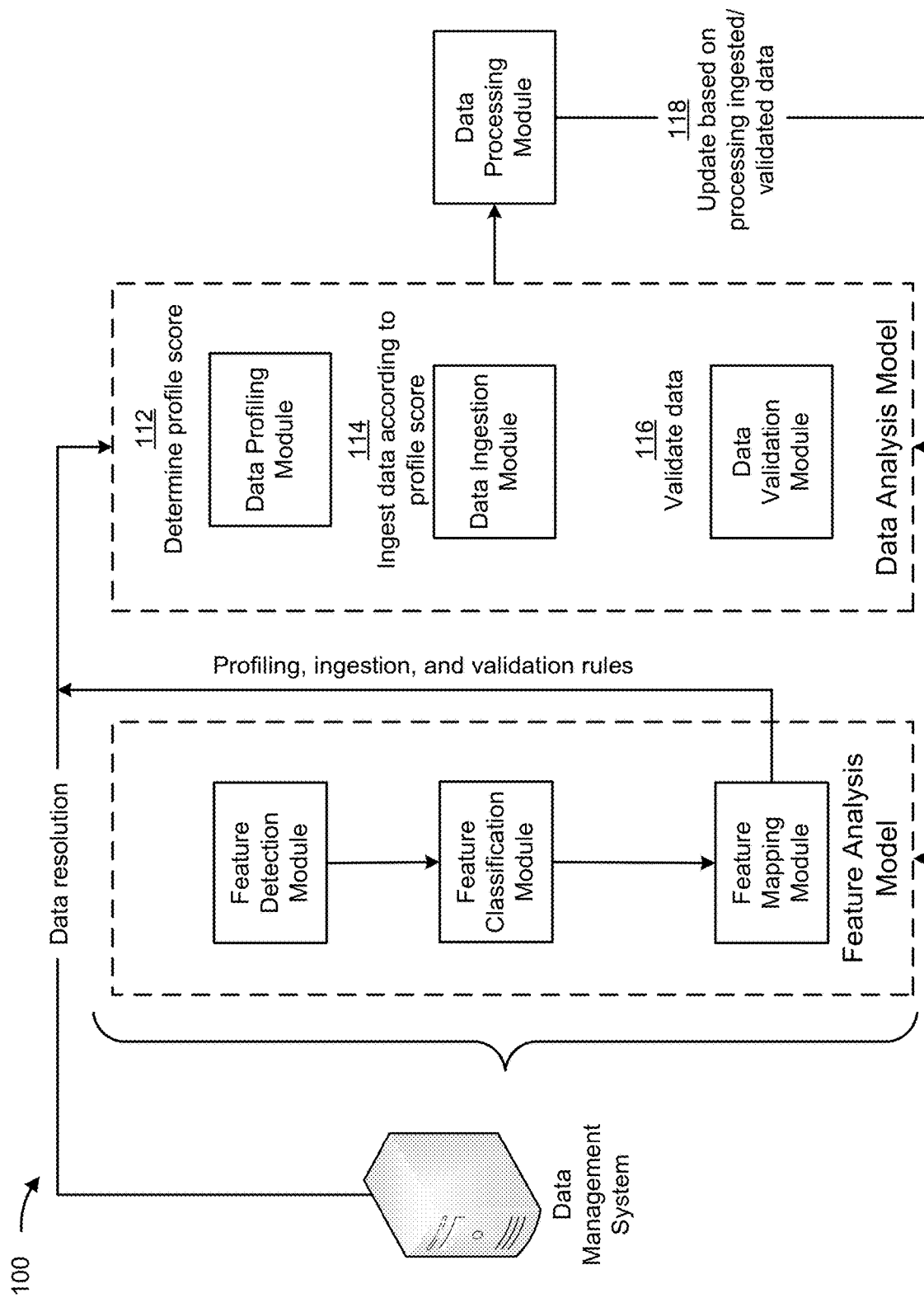
Figure 1C:
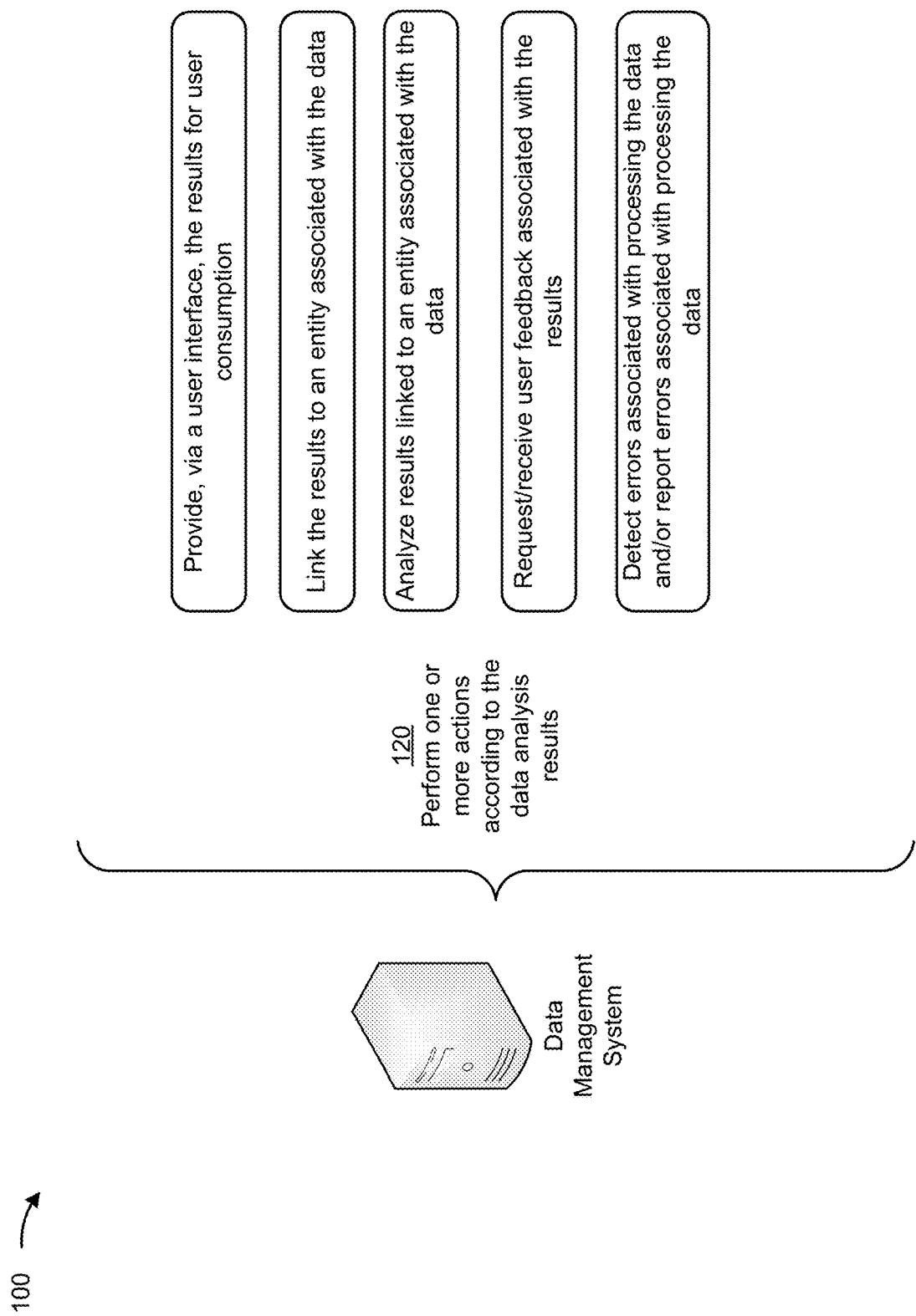

FIGS. 1A-1C are diagrams of one or more example implementations 100 as described herein. As shown in FIGS. 1A-1C, example 100 includes a data management system and a data source. The data source may include one or more devices for obtaining, generating, and/or storing a data input and providing the data input to the data management system. For example, the data source may include a user device (e.g., a computer, a laptop, a table, a mobile phone, and/or the like), a data storage device, a server device, and/or the like.

As shown in FIG. 1A, and by reference number 102, the data management system receives data from the data source. The data may be associated with an event that is associated with the data source. For example, the data may be associated with an insurance claim that is associated with a medical procedure (e.g., an event) that was performed on a user and was submitted to an insurance provider associated with the data source. The insurance provider (e.g., the data source) may receive the insurance claim and may submit data associated with the insurance claim to the data management system.

In some implementations, the data includes a plurality of data sets received from a plurality of different data sources and/or comprising a plurality of different formats. Each data set may be associated with a respective event that is associated the data source from which the data set is received.

In some implementations, the data management system may utilize a data connector to receive a data set from a data source of the plurality of different data sources. The data management system may include a plurality of data connectors that are configured to communicate with different technologies, such as a structured query language (SQL) database, a PostgreSQL database, a non-relational distributed database, and/or the like. The data management system may identify a data connector associated with a technology associated with the data source and may utilize the data connector to receive the data from the data source. The data management system may utilize a different connector to receive a different data set from a different data source configured to communicate via a different technology. In this way, the data management system may be able to receive data from various different data sources utilizing various different technologies.

In some implementations, the data management system may utilize a data resolver to convert the data set from a first format into a second format. The data set may be received from the data source in the first format such as an electronic data interchange (EDI) format, a health level seven (HL7) format, extensible markup language (XML), and/or the like. The data resolver may convert the data set into a comma-separated values (CSV) file that stores the data in a tabular format. The data management system may utilize a different data resolver to convert another data set from a different format into the second format. In this way, the data management system may receive data sets in multiple different formats and may quickly and efficiently convert the different formats into a common format utilized by the data management system.

In some implementations, the data may be data at rest. The data at rest may include data obtained from a data structure (e.g., a database, a table, a list, and/or the like), a data replication source, a relational database management system (RDBMS), a secure file transfer protocol (SFTP) adapter, and/or the like. In some implementations, the data may be data in motion. The data in motion may include streaming data, data obtained via an application program interface (API), data obtained from a stream-processing platform, and/or the like.

In some implementations, the data management system may receive the data based on the occurrence of an action. For example, the data management system may receive the data based on the data being generated by the data source, based on the data source receiving the data, based on the data source receiving a request for the data from the data management system, and/or the like.

Alternatively, and/or additionally, the data management system may receive the data periodically. The data source may periodically (e.g., hourly, daily, weekly, and/or the like) provide data that is provided to, and/or generated by, the data source to the data management system.

The data management system may process the data to determine input values included in the data and associated with the event. In some implementations, the data management system utilizes a first machine learning model to process the data to determine the input values. For example, as shown by reference number 104, the data management system parses the data using a data resolution model to determine the input values.

The input values may include data indicating a value of a parameter (e.g., a temperature, data indicating a state or condition of a device (e.g., off, on, idle, and/or the like), data indicating a value of a field of a form (e.g., data indicating a name or date input into a field of an electronic form), measured data (e.g., data obtained by a sensor), calculated data (e.g., data obtained by processing other data), and/or the like.

In some implementations, the data management system may train the data resolution model to determine the input values based on one or more data resolution parameters associated with identifying input values included in a dataset, such as a format of a type of input value (e.g., a format of an input value corresponding to a date, a format of an input value corresponding to a name of a user, and/or the like), a position of the type of input value within the data (e.g., text located at a top of a page and/or centered may correspond to a title or a heading, a set of integers located at an upper corner may correspond to a date, and/or the like), and/or the like. The data management system may train the data resolution model using historical data associated with identifying input values according to the one or more data resolution parameters. Using the historical data and the one or more data resolution parameters as inputs to the data resolution model, the data management system may process the data to identifying the input values. In some implementations, the data management system trains and/or utilizes the data resolution model to process the data in a manner similar to that described below with respect to FIG. 2.

Based on applying a rigorous and automated process associated with identifying the input values, the data management system enables recognition and/or identification of hundreds, thousands, or millions of features for hundreds, thousands, or millions of input values, thereby increasing an accuracy and consistency of identifying input values included in data relative to requiring computing resources to be allocated for hundreds or thousands of technicians to manually identifying the input values for hundreds, thousands, or millions of datasets.

In some implementations, the data management system utilizes a second machine learning model (e.g., a feature analysis model, as shown in FIG. 1A) to process the input values. The second machine learning model may utilize a tri-fold approach that utilizes a plurality of modules to analyze the data, as described below.

As shown by reference number 106, a feature detection module determines features associated with the input values. The feature detection module may utilize a deep learning by semantic detection (DLSD) algorithm that analyzes the data based on the input values and determines features associated with the input values. A feature may be a classification, a tag, metadata, and/or the like that indicates a property of the input value and/or a type of information associated with the input value. For example, the input value may be a name of a user associated with the data and the feature may be "name" to indicate that the input value includes information indicating the name of a user.

In some implementations, the feature detection module determines the feature based on a configuration of the input value. The configuration of the input value may be a format and/or a manner in which data included in the input value is arranged. In some implementations, the feature detection module determines the configuration of the input value based on a characteristic associated with the input value. The characteristic may be a type of data (e.g., text, number, integer, and/or the like) associated with the input value, a format of the input value (e.g., a input value corresponding to a date may have a configuration of two integers followed by a back slash followed by two integers followed by a back slash followed by four integers), a symbol associated with the input value (e.g., a monetary amount may be associated with a dollar sign, a temperature may be associated with a degree symbol, and/or the like), a source of the data (e.g., an input value included in data obtained from a particular source may be associated with a particular format), a protocol associated with receiving the data (e.g., a communication protocol), and/or the like.

In some implementations, the feature detection module determines the configuration based on a category associated with the data. The feature detection module may determine that the data is associated with a particular category of data (e.g., insurance claim data, credit card transaction data, and/or the like). The feature detection module may determine the particular category of data based on information included in the data (e.g., an identifier indicating the particular category of data), based on the data source being associated with the particular category of data (e.g., based on the data source being associated with an insurance provider), based on a communication protocol associated with receiving the data, and/or the like.

The feature detection module may determine a group of features associated with the particular category of data. For example, the feature detection module may obtain the group of features from a data structure (e.g., a database, a list, a table, and/or the like) storing groups of features associated with categories of data. The feature detection module may obtain the group of features associated with the particular category of data from the data structure. The group of features may be associated with respective configurations. The feature detection module may determine that a configuration of the input value corresponds to a configuration associated with a particular feature included in the group of features. The feature detection module may tag the input value with the feature tag associated with the particular feature based on the configuration of the input value corresponding to the configuration associated with the particular feature.

In some implementations, the feature detection module determines a confidence score associated with tagging the input value with the feature tag. The confidence score may correspond to a measure of confidence that the input value is properly tagged as being associated with the feature indicated by the feature tag.

As an example, the feature detection module may receive an input value comprising a series of integers separated by two back slashes (e.g., 09/26/2022, as shown in FIG. 1A) as an input. The feature detection module may determine that the input value comprises a date based on the configuration of the input value. The feature detection module may determine a difference in time between a current date and a date indicated by the input value (e.g., a quantity of days, months, years, and/or the like that the date indicated by the input value occurs before/after the current date). The feature detection module may associate the input value with a feature (e.g., PLAN_EXP_DATE, as shown in FIG. 1A) based on the difference in time (e.g., based on the difference in time being a quantity of time occurring in the future (e.g., a future date) and based on determining that the feature is a feature that may be associated with a future date). The feature detection module may determine an accuracy or confidence score associated with associating the input value with the feature. The feature detection module may determine the accuracy or confidence score based on a likelihood that the input value is correctly associated with the determined feature. As shown in FIG. 1A, the feature detection module determines an accuracy of 90% associated with determining that the input value 09/26/2022 is correctly associated with the feature PLAN_EXP_DATE.

In some implementations, the data management system may train the feature detection module of the second machine learning model based on one or more parameters associated with determining a feature associated with an input value, such as a format of a type of input value, a range of values associated with a particular category of data (e.g., a range of values associated with a particular type of insurance claim, a range of values associated with a blood pressure reading of a user, and/or the like), and/or the like. The data management system may train the feature detection module of the second machine learning model using historical data associated with determining a feature associated with an input value according to the one or more parameters. Using the historical data and the one or more parameters as inputs to the feature detection module of the second machine learning model, the data management system may determine the features associated with the input values. In some implementations, the data management system trains and/or uses the feature detection module of the second machine learning model to determine the feature associated with the input values in a manner similar to that described below with respect to FIG. 2.

Based on applying a rigorous and automated process associated with determining feature associated with input values, the data management system enables recognition and/or identification of hundreds, thousands, or millions of features for hundreds, thousands, or millions of features, thereby increasing an accuracy and consistency of determining feature associated with input values relative to requiring computing resources to be allocated for hundreds or thousands of technicians to manually determine feature for hundreds, thousands, or millions of input values.

As shown by reference number 108, a feature classification module of the feature analysis model classifies features. The feature classification module may classify the features associated with input values included in the data based on a subject area associated with the features. For example, as shown in FIG. 1A, the feature classification module classifies features associated with a user (e.g., FIRST_NAME, GENDER_CODE, PLAN_EXP_DATE, ACTIVE_FLAG, and PRODUCT_TYPE, as shown in FIG. 1A) as member features and classifies features associated with an insurance claim (e.g., CLAIM_ID, CLAIM_TYPE, and CLAIM_AMT, as shown in FIG. 1A) as claim features.

In some implementations, the data management system may train the feature classification module of the second machine learning model based on one or more parameters associated with classifying features. The data management system may train the feature classification module of the second machine learning model using historical data associated with classifying features according to the one or more parameters. Using the historical data and the one or more parameters as inputs to the feature classification module of the second machine learning model, the data management system may classify the features associated with the input values. In some implementations, the data management system trains and/or uses the feature classification module of the machine learning model to classify the features associated with the input values in a manner similar to that described below with respect to FIG. 2.

Based on applying a rigorous and automated process associated with classifying features associated with input values, the data management system enables recognition and/or identification of hundreds, thousands, or millions of classifications for hundreds, thousands, or millions of features, thereby increasing an accuracy and consistency of classifying features associated with input values relative to requiring computing resources to be allocated for hundreds or thousands of technicians to manually classify features for hundreds, thousands, or millions of input values.

As shown by reference number 110, a feature mapping module of the feature analysis model maps input values to rule profiles. In some implementations, the feature mapping module maps the input values to a profiling rule profile, an ingestion rule profile, and a validation rule profile.

The profile rule profile may include one or more profile rules associated with determining a quality associated with the input value. An input value may be determined to be a good or valid input value when the input value complies with a profile rule to which the input value is mapped. The input value may be determined to be a bad or invalid input value when the input value fails to comply with the profile rule. As an example, the profile rule profile may include a first rule indicating that an input value associated with a particular classification is a mandatory input value (e.g., cannot be a null value). The feature mapping module may map an input value associated with a feature associated with the particular classification to the first rule.

In some implementations, the feature mapping module maps an input value to a profile rule based on the input value being related to another input value. As an example, a first input value may be associated with a feature indicating that the data is associated with an insurance policy and a second input value may be associated with a feature indicating an expiration date associated with the insurance policy. The feature mapping module may determine that the first input value is a valid input value only when the second input value indicates a future date (e.g. a date occurring after a current date). The feature mapping module may determine that the first input value is related to the second input value based on the first input value being a valid input value only when the second input value indicates the future date. The feature mapping module may map the first input value to a profile rule indicating that the first input value is valid only when the second input value indicates the future date based on the relationship.

The ingestion rule profile may include one or more ingestion rules associated with converting the data into the consumable format. The consumable format may be a standardized format that enables the data to be analyzed via a common process. By converting the data into the consumable format, the data management system may reduce the time and resources (e.g., human resources, computing resources, and/or the like) required to analyze the data.

In some implementations, the ingestion rule profile may include an ingestion rule associated with utilizing standardizing input values associated with a particular feature. For example, the ingestion rule profile may include an ingestion rule indicating that an input value associated with the feature "date" is to have a format that utilizes two integers to represent the month, two integers to represent the day, and four integers to represent the year without any characters separating the integers (e.g., MMDDYYY).

In some implementations, the ingestion rule profile may include an ingestion rule for standardizing a format of the data. For example, the ingestion rule profile may include an ingestion rule indicating that the data is to be XML data.

By converting the data into the consumable format, the data management system may reduce the time and resources (e.g., human resources, computing resources, and/or the like) required to analyze the data. Further, the consumable format may the data to be analyzed via a common process thereby allowing relationships, dependencies, trends, and/or the like to be easily identified.

The validation rule profile may include one or more validation rules associated with validating the data. The one or more validation rules may indicate one or more requirements associated with the data (e.g., a required input value, a threshold profile score (described below), and/or the like). In some implementations, the one or more validation rules may be provided by an entity associated with the data and/or the data source. For example, the data source may be associated with an insurance provider and the one or more validation rules may be provided to the data management system by the insurance provider.

In some implementations, the data management system may train the feature mapping module of the second machine learning model based on one or more parameters associated with mapping input values to rule profiles. The data management system may train the feature mapping module of the second machine learning model using historical data associated with mapping input values to rule profiles according to the one or more parameters. Using the historical data and the one or more parameters as inputs to the feature mapping module of the second machine learning model, the data management system may map input values to rule profiles. In some implementations, the data management system trains and/or uses the feature mapping module of the second machine learning model to map input values to rule profiles in a manner similar to that described below with respect to FIG. 2.

Based on applying a rigorous and automated process associated with mapping input values to rule profiles, the data management system enables recognition and/or identification of hundreds, thousands, or millions of classifications for hundreds, thousands, or millions of rule profiles, thereby increasing an accuracy and consistency of mapping input values to rule profiles relative to requiring computing resources to be allocated for hundreds or thousands of technicians to manually map hundreds, thousands, or millions of input values to rules profiles.

In some implementations, the data management system utilizes a third machine learning model (e.g., a data analysis model, as shown in FIG. 1B) to process the data based on an output of the second machine learning model.

As shown in FIG. 1B, and by reference number 112, a data profiling module of the data analysis model determines a profile score associated with the data. The profile score may indicate a degree to which the input values comply with the profile rules to which the input values are mapped. For example, the profile score may indicate a percentage of input values that comply with the profile rules to which the input values are mapped, a percentage of input values associated with a particular classification that comply with the profile rules to which the input values are mapped, and/or the like. As an example, an input value corresponding to a name of a user may be associated with a profile rule indicating that the input value is a mandatory value, that the input value must correspond to a name included in a list of names of active members, and/or the like. The data management system may determine that the input value complies with the profile rule when the input value is included in the data, when the input value corresponds to a name included in a list of names of active members, and/or the like. The data management system may determine the profile score based on a percentage of input values that comply to the profile rules to which they are mapped.

In some implementations, the data management system may train the data profiling module of the third machine learning model based on one or more parameters associated with determining a profile score associated with the data. The data management system may train the data profiling module of the third machine learning model using historical data associated with determining profile scores according to the one or more parameters. Using the historical data and the one or more parameters as inputs to the data profiling module of the third machine learning model, the data management system may determine a profile score associated with the data. In some implementations, the data management system trains and/or uses the data profiling module of the third machine learning model to determine the profile scores in a manner similar to that described below with respect to FIG. 2.

Based on applying a rigorous and automated process associated with determining profile scores, the data management system enables a determination of hundreds, thousands, or millions of classifications for hundreds, thousands, or millions of profile scores, thereby increasing an accuracy and consistency of determining profile scores relative to requiring computing resources to be allocated for hundreds or thousands of technicians to manually determine hundreds, thousands, or millions of profile scores.

As shown by reference number 114, a data ingestion module of the data analysis model ingests data according to the profile score. In some implementations, the data ingestion module determines whether to ingest the data based on the profile score. The data ingestion module may determine whether the profile score satisfies a threshold profile score (e.g., 75%, 80%, 90%, and/or the like). The data ingestion module may determine whether to ingest the data based on whether the profile score satisfies the threshold profile score.

In some implementations, the profile score fails to satisfy the threshold profile score. The data ingestion module may determine not to ingest the data based on the profile score failing to satisfy the threshold profile score. In this way, the data management system may prevent the ingestion of data that is unable to be processed by a data processing module of the data management system. By preventing the ingestion of data that is unable to be processed, the data management system may conserve computing resources that may otherwise be utilized to partially process the data, attempt to partial the data, and/or the like.

In some implementations, the data management system causes the data to be updated based on the data ingestion module determining not to ingest the data. The data management system may provide information indicating that the profile score fails to satisfy the threshold profile score, that the data is not to be ingested, and/or the like to cause the data to be updated. For example, the data management system may provide the notification to the data source. The data source may receive the notification and may cause the data to be updated based on the notification (e.g., re-send the data to the data management system, provide a notification to a user indicating that the user is to provide additional and/or updated data, and/or the like). Alternatively, and/or additionally, the data management system may discard one or more portions of the data based on determining not to ingest the data.

In some implementations, the profile score satisfies the threshold profile score. The data management system may ingest the data based on the data ingestion module determining that the profile score satisfies the threshold profile score. The data ingestion module may process the data based on the ingestion rule profile mapped to the input values. The data ingestion module may provide the processed data to a data processing module of the data management system. The data processing module may ingest the data to output data analysis results determined based on ingesting the data.

In some implementations, the data management system may train the data ingestion module of the third machine learning model based on one or more parameters associated with processing the data based on the ingestion rule profile. The data management system may train the data ingestion module of the third machine learning model using historical data associated with processing the data based on the ingestion rule profile according to the one or more parameters. Using the historical data and the one or more parameters as inputs to the data ingestion module of the third machine learning model, the data management system may process the data based on the ingestion rule profile. In some implementations, the data management system trains and/or uses the data ingestion module of the third machine learning model to process the data based on the ingestion rule profile in a manner similar to that described below with respect to FIG. 2.

Based on applying a rigorous and automated process associated with processing the data based on the ingestion rule profile, the data management system enables a determination of hundreds, thousands, or millions of classifications for hundreds, thousands, or millions of ingestion rules, thereby increasing an accuracy and consistency of processing the data based on the ingestion rule profile relative to requiring computing resources to be allocated for hundreds or thousands of technicians to manually process data based on hundreds, thousands, or millions of ingestion rule profiles.

As shown by reference number 116, a data validation module of the data analysis model validates the data. The data management system may validate the data based on mapping the input values to the validation rule profile. The data management system may determine whether the input values comply with the one or more validation rules included in the validation rule profile. The data management system may validate the data when a quantity of input values that satisfy the one or more validation rules satisfies a threshold quantity of input values (e.g., 90%, 95%, and/or the like).

As shown by reference number 118, the feature analysis model and the data analysis model are updated based on processing ingested/validated data. In some implementations, the data management system may receive feedback associated with processing the ingested/validated data. For example, the data management system may receive feedback input by a user indicating whether an input value was correctly mapped to a rule, whether an input value was associated with a correct feature, and/or the like. The data management system may utilize the feedback to update a machine learning model associated with the feedback.

As shown in FIG. 1C, and by reference number 120, the data management system performs one or more actions according to the data analysis results. In some implementations, the one or more actions include providing, via a user interface, the results for user consumption. The data management system may provide a file, a graph, a table, and/or the like that enables the user to consume, analyze, interpret, and/or the like the results.

In some implementations, the one or more actions include linking the results to an entity associated with the data. The data management system may determine an entity (e.g., a user, a business, an organization, and/or the like) associated with one or more portions of the data and/or the data source and may identify one or more portions of the results associated with the entity. The data management system may associate the entity with the one or more portions of the results. In this way, the data management system may enable results associated with an entity and determined based on multiple datasets to be easily identified.

In some implementations, the one or more actions include analyzing the results linked to the entity. The data management system may analyze the one or more portions of the results associated with the entity and may determine a trend associated with the entity and/or the results, a discrepancy in the results, and/or the like based on the analysis. In some implementations, the data management system may identify a trend indicating a fraudulent behavior (e.g., a medical provider performing a large quantity of a particular type and/or expensive procedure, a quantity of similar purchases made within a short period of time at locations separated by large distances, and/or the like).

In some implementations, the data management system may identify a trend indicating whether a user is following a prescribed medical treatment plan. The data may include a first data set received from a health care provider that includes data associated with health care information for the user. The data may include a second data set received from a credit card company that includes data indicating purchases made by the user. The data management system may determine that the user is associated with a prescribed health care treatment plan that requires the user to refrain from drinking alcohol based on a portion of the results links to the user and associated with the first data set. The data management system may determine that the user has made multiple purchases of alcoholic beverages based on a portion of the results linked to the user and associated with the second data set. The data management system may determine that the user is not following the prescribed health care treatment plan based on the user having made the multiple purchases of the alcoholic beverages. The data management system may provide a notification indicating that the user is not following the prescribed health care plan to the user, to the health care provider, to a medical insurance provider associated with the user, and/or the like.

In some implementations, the one or more actions include requesting and/or receiving user feedback associated with the results. The data management system may request user feedback associated with the results from an entity associated with the data based on outputting the results. In some implementations, the request may be included in the notification provided to the user, the health care provider, and medical insurance provider, and/or the like. The request may indicate that the entity associated with the data is to review a portion the results linked to the entity and is to provide feedback regarding the results. The data management system may receive the feedback from the entity. For example, the user may receive the notification and may review the portion of the results linked to the user. The user may determine that the multiple purchases indicated in the results were incorrected tagged as purchases of alcoholic beverages. The user may provide feedback indicating that the multiple purchases were incorrected tagged. The data management system may receive the requested feedback and may utilize the feedback to update the machine learning models as described above.

In some implementations, the one or more actions include detecting and/or reporting errors associated with processing the data. The data management system may analyze the results and may determine that a rule (e.g., a profile rule, an ingestion rule, and/or the like) could not be applied to an input value. The data management system may detect and/or report an error associated with processing the data based on the rule not being able to be applied to the input value. For example, the data management system may detect that a rule was incorrectly mapped to an input value, that an input value was incorrectly associated with a particular feature, that a feature was incorrectly associated with a particular classification, and/or the like based on the rule not being able to be applied to the input value.

As indicated above, FIGS. 1A-1C are provided as an example. Other examples may differ from what is described with regard to FIGS. 1A-1C. The number and arrangement of devices shown in FIGS. 1A-1C are provided as an example. In practice, there may be additional devices, fewer devices, different devices, or differently arranged devices than those shown in FIGS. 1A-1C. Furthermore, two or more devices shown in FIGS. 1A-1C may be implemented within a single device, or a single device shown in FIGS. 1A-1C may be implemented as multiple, distributed devices. Additionally, or alternatively, a set of devices (e.g., one or more devices) shown in FIGS. 1A-1C may perform one or more functions described as being performed by another set of devices shown in FIGS. 1A-1C.

Figure 2:
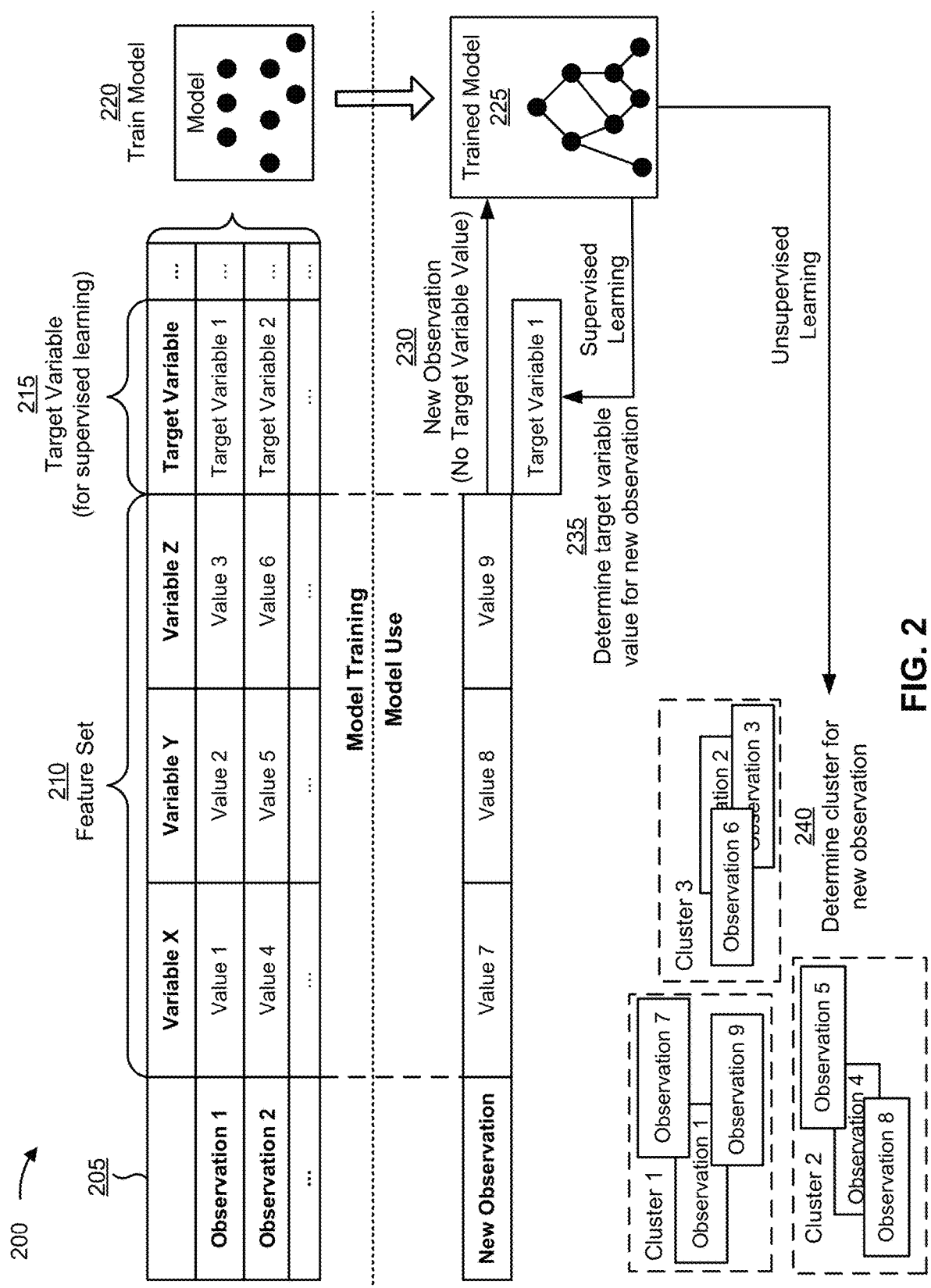
FIG. 2 is a diagram illustrating an example of training and using a machine learning model in connection with data ingestion.

FIG. 2 is a diagram illustrating an example 200 of training and using a machine learning model in connection with data ingestion. The machine learning model training and usage described herein may be performed using a machine learning system. The machine learning system may include or may be included in a computing device, a server, a cloud computing environment, and/or the like, such as the data management system 301 described in more detail elsewhere herein.

As shown by reference number 205, a machine learning model may be trained using a set of observations. The set of observations may be obtained from historical data, such as data gathered during one or more processes described herein. In some implementations, the machine learning system may receive the set of observations (e.g., as input) from data source 330, as described elsewhere herein.

As shown by reference number 210, the set of observations includes a feature set. The feature set may include a set of variables, and a variable may be referred to as a feature. A specific observation may include a set of variable values (or feature values) corresponding to the set of variables. In some implementations, the machine learning system may determine variables for a set of observations and/or variable values for a specific observation based on input received from the data management system 301. For example, the machine learning system may identify a feature set (e.g., one or more features and/or feature values) by extracting the feature set from structured data, by performing natural language processing to extract the feature set from unstructured data, by receiving input from an operator, and/or the like.

As shown by reference number 215, the set of observations may be associated with a target variable. The target variable may represent a variable having a numeric value, may represent a variable having a numeric value that falls within a range of values or has some discrete possible values, may represent a variable that is selectable from one of multiple options (e.g., one of multiples classes, classifications, labels, and/or the like), may represent a variable having a Boolean value, and/or the like. A target variable may be associated with a target variable value, and a target variable value may be specific to an observation.

The target variable may represent a value that a machine learning model is being trained to predict, and the feature set may represent the variables that are input to a trained machine learning model to predict a value for the target variable. The set of observations may include target variable values so that the machine learning model can be trained to recognize patterns in the feature set that lead to a target variable value. A machine learning model that is trained to predict a target variable value may be referred to as a supervised learning model.

In some implementations, the machine learning model may be trained on a set of observations that do not include a target variable. This may be referred to as an unsupervised learning model. In this case, the machine learning model may learn patterns from the set of observations without labeling or supervision, and may provide output that indicates such patterns, such as by using clustering and/or association to identify related groups of items within the set of observations.

As shown by reference number 220, the machine learning system may train a machine learning model using the set of observations and using one or more machine learning algorithms, such as a regression algorithm, a decision tree algorithm, a neural network algorithm, a k-nearest neighbor algorithm, a support vector machine algorithm, and/or the like. After training, the machine learning system may store the machine learning model as a trained machine learning model 225 to be used to analyze new observations.

As shown by reference number 230, the machine learning system may apply the trained machine learning model 225 to a new observation, such as by receiving a new observation and inputting the new observation to the trained machine learning model 225. The machine learning system may apply the trained machine learning model 225 to the new observation to generate an output (e.g., a result). The type of output may depend on the type of machine learning model and/or the type of machine learning task being performed. For example, the output may include a predicted value of a target variable, such as when supervised learning is employed. Additionally, or alternatively, the output may include information that identifies a cluster to which the new observation belongs, information that indicates a degree of similarity between the new observation and one or more other observations, and/or the like, such as when unsupervised learning is employed.

As an example, the trained machine learning model 225 may predict a value for the target variable for the new observation, as shown by reference number 235. Based on this prediction, the machine learning system may provide a first recommendation, may provide output for determination of a first recommendation, may perform a first automated action, may cause a first automated action to be performed (e.g., by instructing another device to perform the automated action), and/or the like.

In some implementations, the trained machine learning model 225 may classify (e.g., cluster) the new observation in a cluster, as shown by reference number 240. The observations within a cluster may have a threshold degree of similarity. As an example, if the machine learning system classifies the new observation in a first cluster, then the machine learning system may provide a first recommendation, may perform a first automated action, may cause a first automated action to be performed, and/or the like.

As another example, if the machine learning system were to classify the new observation in a second cluster, then the machine learning system may provide a second (e.g., different) recommendation and/or may perform or cause performance of a second (e.g., different) automated action.

In some implementations, the recommendation and/or the automated action associated with the new observation may be based on a target variable value having a particular label (e.g., classification, categorization, and/or the like), may be based on whether a target variable value satisfies one or more threshold (e.g., whether the target variable value is greater than a threshold, is less than a threshold, is equal to a threshold, falls within a range of threshold values, and/or the like), may be based on a cluster in which the new observation is classified, and/or the like.

As indicated above, FIG. 2 is provided as an example. Other examples may differ from what is described in connection with FIG. 2.

Figure 3:
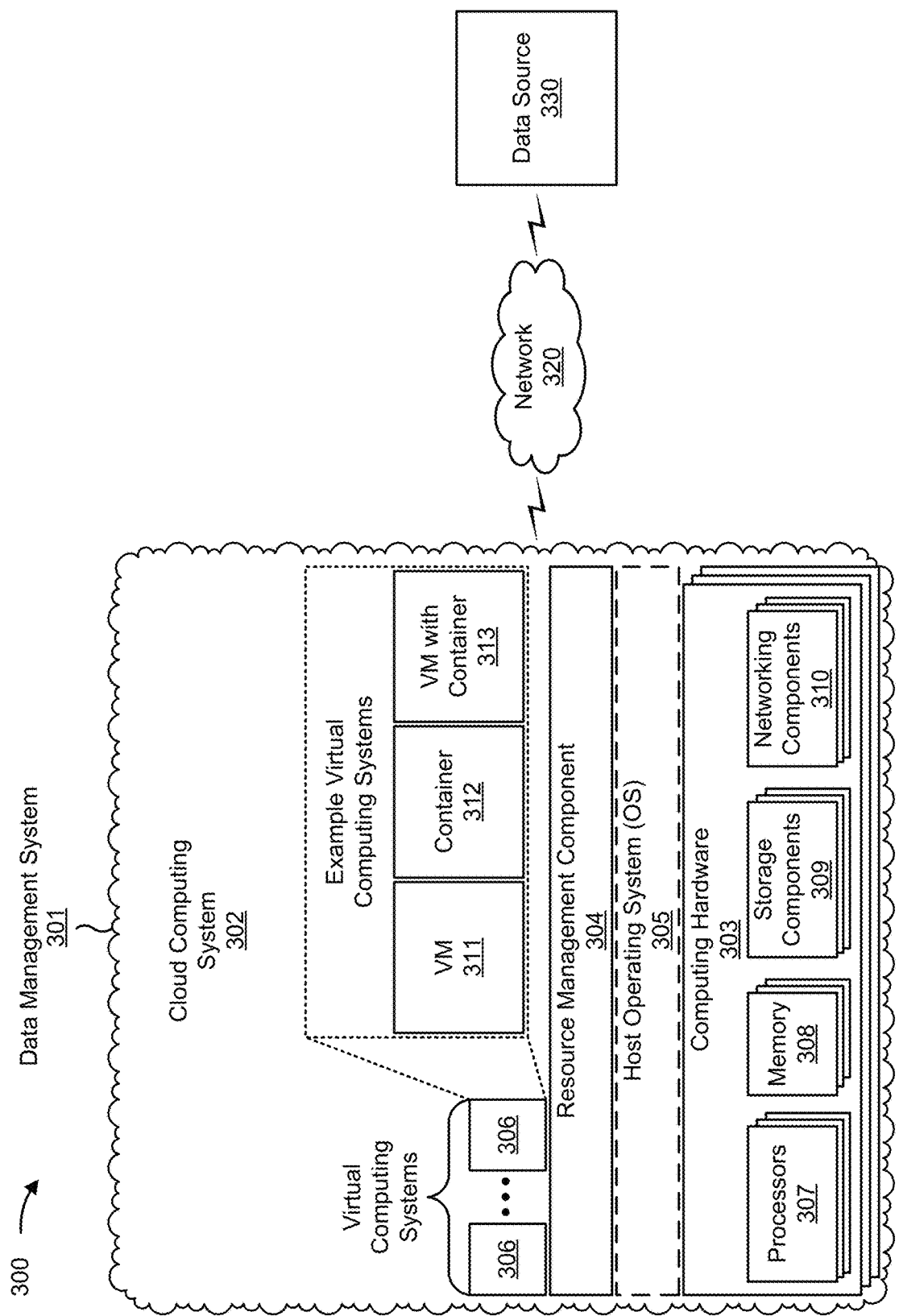
FIG. 3 is a diagram of an example environment in which systems and/or methods described herein may be implemented.

FIG. 3 is a diagram of an example environment 300 in which systems and/or methods described herein may be implemented. As shown in FIG. 3, environment 300 may include a data management system 301, which may include one or more elements of and/or may execute within a cloud computing system 302. The cloud computing system 302 may include one or more elements 303-313, as described in more detail below. As further shown in FIG. 3, environment 300 may include a network 320, and/or a data source 330. Devices and/or elements of environment 300 may interconnect via wired connections and/or wireless connections.

The cloud computing system 302 includes computing hardware 303, a resource management component 304, a host operating system (OS) 305, and/or one or more virtual computing systems 306. The resource management component 304 may perform virtualization (e.g., abstraction) of computing hardware 303 to create the one or more virtual computing systems 306. Using virtualization, the resource management component 304 enables a single computing device (e.g., a computer, a server, and/or the like) to operate like multiple computing devices, such as by creating multiple isolated virtual computing systems 306 from computing hardware 303 of the single computing device. In this way, computing hardware 303 can operate more efficiently, with lower power consumption, higher reliability, higher availability, higher utilization, greater flexibility, and lower cost than using separate computing devices.

Computing hardware 303 includes hardware and corresponding resources from one or more computing devices. For example, computing hardware 303 may include hardware from a single computing device (e.g., a single server) or from multiple computing devices (e.g., multiple servers), such as multiple computing devices in one or more data centers. As shown, computing hardware 303 may include one or more processors 307, one or more memories 308, one or more storage components 309, and/or one or more networking components 310. Examples of a processor, a memory, a storage component, and a networking component (e.g., a communication component) are described elsewhere herein.

The resource management component 304 includes a virtualization application (e.g., executing on hardware, such as computing hardware 303) capable of virtualizing computing hardware 303 to start, stop, and/or manage one or more virtual computing systems 306. For example, the resource management component 304 may include a hypervisor (e.g., a bare-metal or Type 1 hypervisor, a hosted or Type 2 hypervisor, and/or the like) or a virtual machine monitor, such as when the virtual computing systems 306 are virtual machines 311. Additionally, or alternatively, the resource management component 304 may include a container manager, such as when the virtual computing systems 306 are containers 312. In some implementations, the resource management component 304 executes within and/or in coordination with a host operating system 305.

A virtual computing system 306 includes a virtual environment that enables cloud-based execution of operations and/or processes described herein using computing hardware 303. As shown, a virtual computing system 306 may include a virtual machine 311, a container 312, a hybrid environment 313 that includes a virtual machine and a container, and/or the like. A virtual computing system 306 may execute one or more applications using a file system that includes binary files, software libraries, and/or other resources required to execute applications on a guest operating system (e.g., within the virtual computing system 306) or the host operating system 305.

Although the data management system 301 may include one or more elements 303-313 of the cloud computing system 302, may execute within the cloud computing system 302, and/or may be hosted within the cloud computing system 302, in some implementations, the data management system 301 may not be cloud-based (e.g., may be implemented outside of a cloud computing system) or may be partially cloud-based. For example, the data management system 301 may include one or more devices that are not part of the cloud computing system 302, such as device 400 of FIG. 4, which may include a standalone server or another type of computing device. The data management system 301 may perform one or more operations and/or processes described in more detail elsewhere herein.

Network 320 includes one or more wired and/or wireless networks. For example, network 320 may include a cellular network, a public land mobile network (PLMN), a local area network (LAN), a wide area network (WAN), a private network, the Internet, and/or the like, and/or a combination of these or other types of networks. The network 320 enables communication among the devices of environment 300.

Data source 330 includes one or more devices capable of receiving, generating, storing, processing, and/or providing information associated with ingesting data, as described elsewhere herein. Data source 330 may include a communication device and/or a computing device. For example, data source 330 may include a user device (e.g., a computer, a laptop, a table, a mobile phone, and/or the like), a database, a server, a database server, an application server, a client server, a web server, a host server, a proxy server, a virtual server (e.g., executing on computing hardware), a server in a cloud computing system, a device that includes computing hardware used in a cloud computing environment, or a similar type of device. Data source 330 may communicate with one or more other devices of environment 300, as described elsewhere herein.

The number and arrangement of devices and networks shown in FIG. 3 are provided as an example. In practice, there may be additional devices and/or networks, fewer devices and/or networks, different devices and/or networks, or differently arranged devices and/or networks than those shown in FIG. 3. Furthermore, two or more devices shown in FIG. 3 may be implemented within a single device, or a single device shown in FIG. 3 may be implemented as multiple, distributed devices. Additionally, or alternatively, a set of devices (e.g., one or more devices) of environment 300 may perform one or more functions described as being performed by another set of devices of environment 300.

Figure 4:
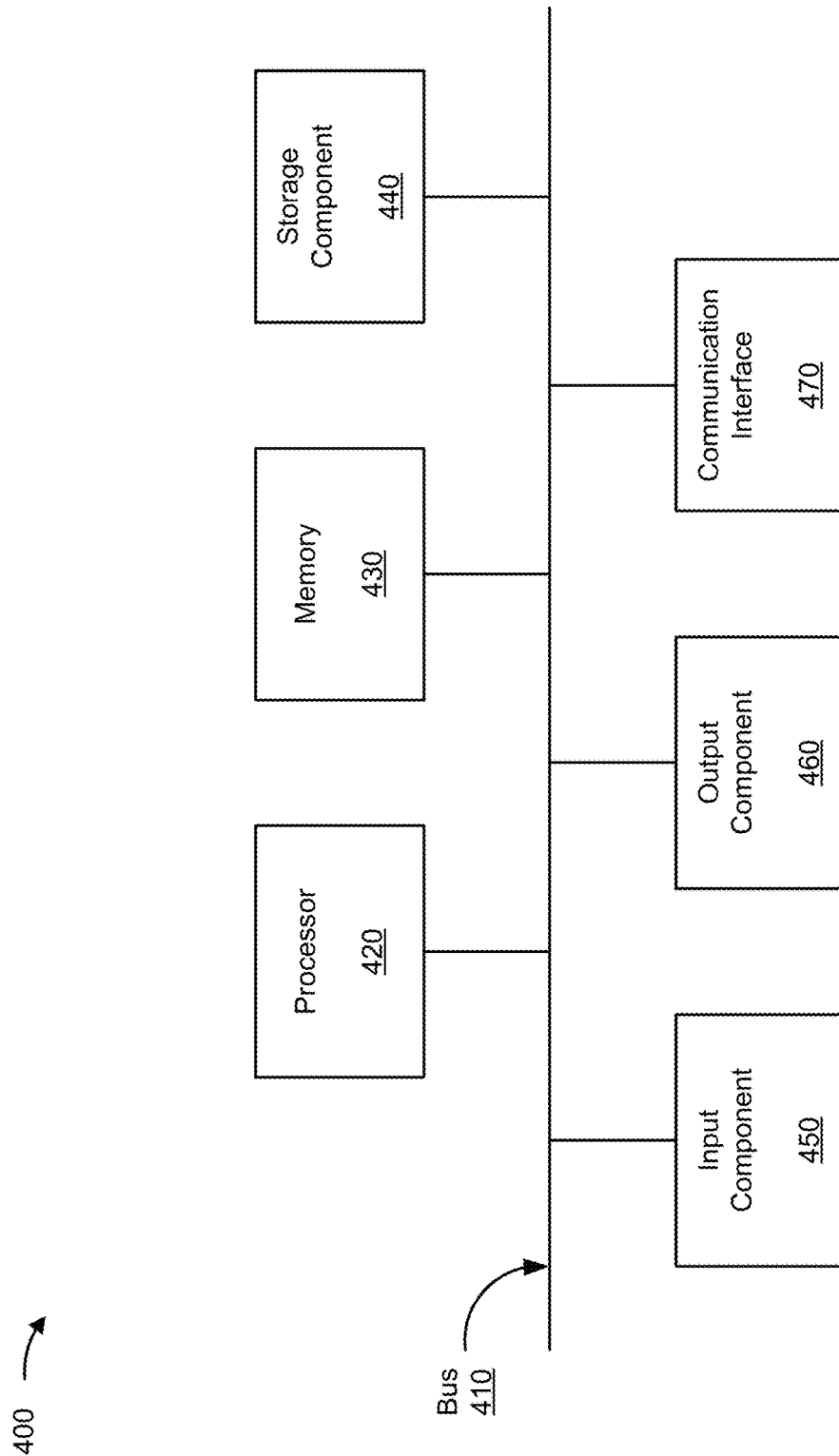
FIG. 4 is a diagram of example components of one or more devices of FIG. 3.

FIG. 4 is a diagram of example components of a device 400, which may correspond to data management system 301 and/or data source 330. In some implementations, data management system 301 and/or data source 330 may include one or more devices 400 and/or one or more components of device 400. As shown in FIG. 4, device 400 may include a bus 410, a processor 420, a memory 430, a storage component 440, an input component 450, an output component 460, and a communication component 470.

Bus 410 includes a component that enables wired and/or wireless communication among the components of device 400. Processor 420 includes a central processing unit, a graphics processing unit, a microprocessor, a controller, a microcontroller, a digital signal processor, a field-programmable gate array, an application-specific integrated circuit, and/or another type of processing component. Processor 420 is implemented in hardware, firmware, or a combination of hardware and software. In some implementations, processor 420 includes one or more processors capable of being programmed to perform a function. Memory 430 includes a random access memory), a read only memory, and/or another type of memory (e.g., a flash memory, a magnetic memory, and/or an optical memory).

Storage component 440 stores information and/or software related to the operation of device 400. For example, storage component 440 may include a hard disk drive, a magnetic disk drive, an optical disk drive, a solid state disk drive, a compact disc, a digital versatile disc, and/or another type of non-transitory computer-readable medium. Input component 450 enables device 400 to receive input, such as user input and/or sensed inputs. For example, input component 450 may include a touch screen, a keyboard, a keypad, a mouse, a button, a microphone, a switch, a sensor, a global positioning system component, an accelerometer, a gyroscope, an actuator, and/or the like. Output component 460 enables device 400 to provide output, such as via a display, a speaker, and/or one or more light-emitting diodes. Communication component 470 enables device 400 to communicate with other devices, such as via a wired connection and/or a wireless connection. For example, communication component 470 may include a receiver, a transmitter, a transceiver, a modem, a network interface card, an antenna, and/or the like.

Device 400 may perform one or more processes described herein. For example, a non-transitory computer-readable medium (e.g., memory 430 and/or storage component 440) may store a set of instructions (e.g., one or more instructions, code, software code, program code, and/or the like) for execution by processor 420. Processor 420 may execute the set of instructions to perform one or more processes described herein. In some implementations, execution of the set of instructions, by one or more processors 420, causes the one or more processors 420 and/or the device 400 to perform one or more processes described herein. In some implementations, hardwired circuitry may be used instead of or in combination with the instructions to perform one or more processes described herein. Thus, implementations described herein are not limited to any specific combination of hardware circuitry and software.

The number and arrangement of components shown in FIG. 4 are provided as an example. Device 400 may include additional components, fewer components, different components, or differently arranged components than those shown in FIG. 4. Additionally, or alternatively, a set of components (e.g., one or more components) of device 400 may perform one or more functions described as being performed by another set of components of device 400.

Figure 5:
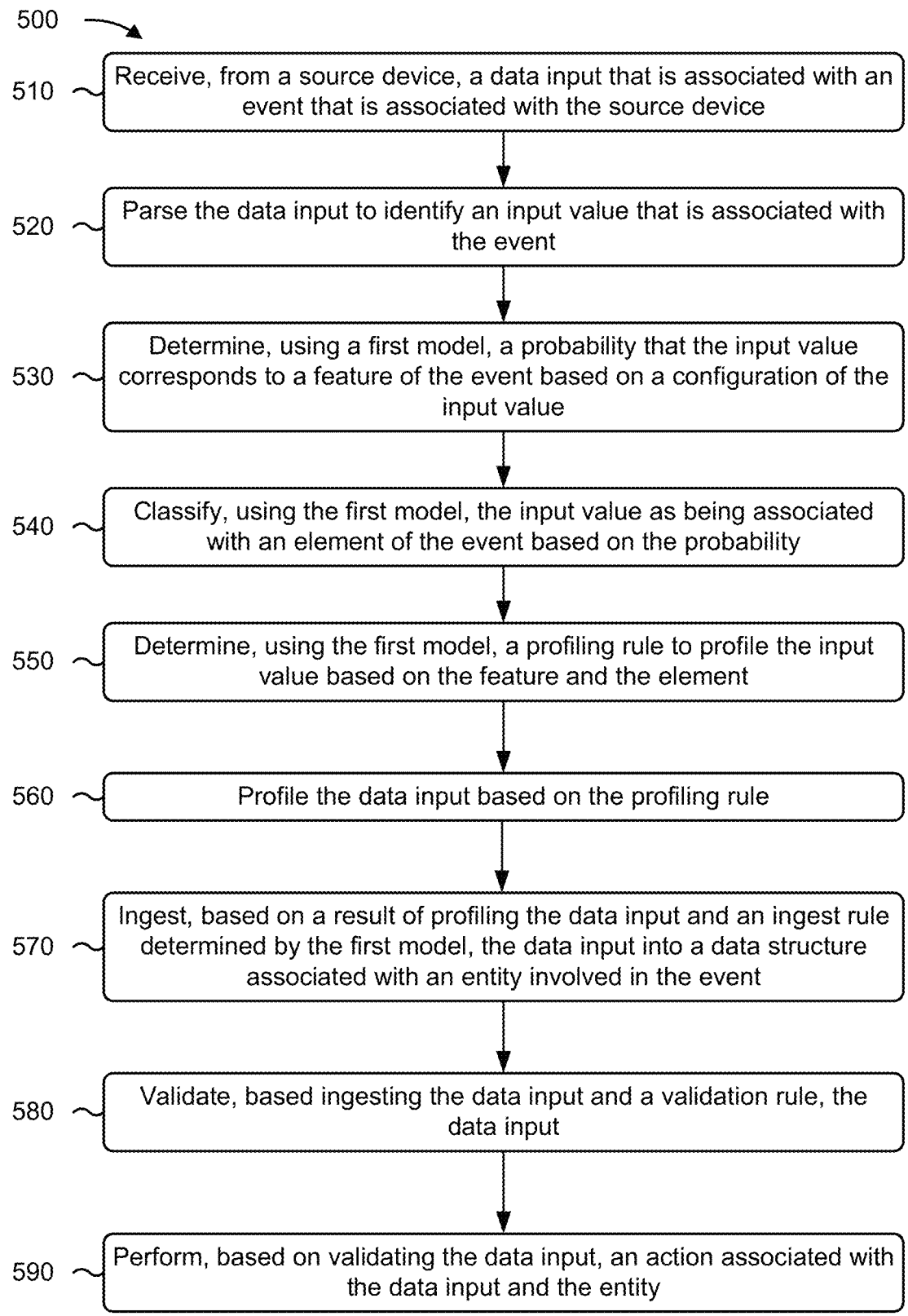
FIG. 5 is a flow chart of example processes relating to data ingestion using artificial intelligence and machine learning.

FIG. 5 is a flow chart of an example process 500 associated with data ingestion using artificial intelligence and machine learning. In some implementations, one or more process blocks of FIG. 5 may be performed by a data management system (e.g., data management system 301). In some implementations, one or more process blocks of FIG. 5 may be performed by another device or a group of devices separate from or including the device, such as a data source (e.g., data source 330) and/or the like. Additionally, or alternatively, one or more process blocks of FIG. 5 may be performed by one or more components of a device 400, such as processor 420, memory 430, storage component 440, input component 450, output component 460, communication component 470, and/or the like.

As shown in FIG. 5, process 500 may include receiving, from a source device, a data input that is associated with an event that is associated with the source device (block 510). For example, the device may receive, from a source device, a data input that is associated with an event that is associated with the source device, as described above.

As further shown in FIG. 5, process 500 may include parsing the data input to identify an input value that is associated with the event (block 520). For example, the device may parse the data input to identify an input value that is associated with the event, as described above.

As further shown in FIG. 5, process 500 may include determining, using a first model, a probability that the input value corresponds to a feature of the event based on a configuration of the input value (block 530). For example, the device may determine, using a first model, a probability that the input value corresponds to a feature of the event based on a configuration of the input value, as described above.

As further shown in FIG. 5, process 500 may include classifying, using the first model, the input value as being associated with an element of the event based on the probability (block 540). For example, the device may classify, using the first model, the input value as being associated with an element of the event based on the probability, as described above.

As further shown in FIG. 5, process 500 may include determining, using the first model, a profiling rule to profile the input value based on the feature and the element (block 550). For example, the device may determine, using the first model, a profiling rule to profile the input value based on the feature and the element, as described above.

As further shown in FIG. 5, process 500 may include profiling, using the first model, the data input based on the profiling rule (block 560). For example, the device may profile, using the first model, the data input based on the profiling rule, as described above.

As further shown in FIG. 5, process 500 may include ingesting, based on a result of profiling the data input and an ingest rule determined by the first model, the data input into a data structure associated with an entity involved in the event (block 570). For example, the device may ingest, based on a result of profiling the data input and an ingest rule determined by the first model, the data input into a data structure associated with an entity involved in the event, as described above.

As further shown in FIG. 5, process 500 may include validating, based on ingesting the input data and a validation rule, the data input (block 580). For example, the device may validate, based on ingesting the input data and a validation rule, the data input, as described above.

As further shown in FIG. 5, process 500 may include performing, based on validating the data input, an action associated with the data input and the entity (block 590). For example, the device may perform, based on validating the data input, an action associated with the data input and the entity, as described above.

Process 500 may include additional implementations, such as any single implementation or any combination of implementations described below and/or in connection with one or more other processes described elsewhere herein.

In a first implementation, parsing the data input comprises: determining a data format of the data input based on a characteristic of the data input, and parsing the data input based on the data format.

In a second implementation, alone or in combination with the first implementation, process 500 includes selecting, based on the configuration, the feature from a plurality of features based on the configuration being mapped to the feature, wherein the probability is being determined based on the input value and the configuration being mapped to the feature.

In a third implementation, alone or in combination with one or more of the first and second implementations, determining the probability comprises: using a deep learning by semantic detection model, of the first model, to: analyze the configuration of the input value based on text types of the input value; determine that the probability corresponds to a highest probability that the feature corresponds to the input value relative to a plurality of other probabilities of other potential features associated with the event, and select the probability and the feature as being associated with the input value based on determining that the probability corresponds to the highest probability.

In a fourth implementation, alone or in combination with one or more of the first through third implementations, the input value is one of a plurality of input values of the data input, and profiling the data input comprises: determining corresponding probabilities that the plurality of input values correspond to certain features of the element, and determining a profile score of the data input based on the corresponding probabilities.

In a fifth implementation, alone or in combination with one or more of the first through fourth implementations, performing the action comprises: determining a validation score associated with validating the data input; determining that the validation score satisfies a threshold validation score; and updating the first model based on the result of profiling the data input.

In a sixth implementation, alone or in combination with one or more of the first through fifth implementations, performing the action comprises: processing, based on the validation score satisfying a threshold validation score, the data input based on the feature or the element, and providing, via a user interface, a data output corresponding to a result of processing the data input.

In a seventh implementation, alone or in combination with one or more of the first through sixth implementations, process 500 includes determining, using a data resolution model, a data format of the data input, wherein the data resolution model is being trained to identify various data formats of data inputs, associated with various data sources, based on historical data inputs associated with a variety of configurations of data the data inputs; and parsing the data input based on the data format.

In an eighth implementation, alone or in combination with one or more of the first through seventh implementations, the one or more instructions, when executed by the one or more processors, further cause the one or more processors to, prior to causing the one or more processors to determine the probability: analyze the configuration of the input value based on text types of the input value; determine that the probability corresponds to a highest probability that the feature corresponds to the input value relative to a plurality of other probabilities of other potential features associated with the event, and select the probability and the feature as being associated with the input value based on determining that the probability corresponds to the highest probability.

In a ninth implementation, alone or in combination with one or more of the first through eighth implementations, process 500 includes determining that the profile score satisfies a threshold associated with ingesting the data input; and storing, based on the profile score satisfying the threshold, the data input in a data structure associated with an entity involved in the event.

In a tenth implementation, alone or in combination with one or more of the first through ninth implementations, the action is a first action and process 500 includes determining, based on storing the data input, a validation score associated with storing the data input based on applying a random factorization analysis to the rule profile and the input value, and performing, based on the validation score, a second action associated with the data input.

In an eleventh implementation, alone or in combination with one or more of the first through tenth implementations, process 500 includes processing, according to the rule profile, the data input based on the feature or the element; and updating the data analysis model or a feature analysis model based on a result of processing the data input, wherein the feature analysis model is being used to determine the probability.

In a twelfth implementation, alone or in combination with one or more of the first through eleventh implementations, process 500 includes processing, according to the rule profile, the data input based on the feature or the element; and providing, via a user interface, a data output corresponding to a result of processing the data input.

In a thirteenth implementation, alone or in combination with one or more of the first through twelfth implementations, process 500 includes determining, using a third model, a data format of the data input, wherein the third model is being trained to identify various data formats of data inputs, associated with various data sources, based on a variety of historical configurations of the data inputs; and parsing the data input based on the data format.

In a fourteenth implementation, alone or in combination with one or more of the first through thirteenth implementations, process 500 includes causing the first model to use a deep learning by semantic detection analysis to: analyze configurations of the input values based on text types within the input values; determine, based on the configurations, probabilities that the input values correspond to particular features of the elements; and generate the feature information based on the probabilities.

In a fifteenth implementation, alone or in combination with one or more of the first through fourteenth implementations, the feature information includes at least one of: information identifying features that are associated with the input values, information identifying which of the elements are associated with the input values, or information identifying rule profiles for the input values, the rule profiles are associated with relationships between the features or relationships between the elements of the event.

In a sixteenth implementation, alone or in combination with one or more of the first through fifteenth implementations, process 500 includes determining that the profile score satisfies a threshold associated with ingesting the data input; and storing, based on the profile score satisfying the threshold, the data input in a data structure associated with an entity involved in the event.

In a seventeenth implementation, alone or in combination with one or more of the first through sixteenth implementations, performing the action includes at least one of: updating at least one of the first model or the second model based on a result of processing the data input, or providing, via a user interface, a data output corresponding to the result of processing the data input.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

The foregoing disclosure provides illustration and description, but is not intended to be exhaustive or to limit the implementations to the precise form disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, etc., depending on the context.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:
   receiving, by a device and from a first source device, a first data input that is associated with an event that is associated with the first source device;
   parsing, by the device, the first data input to identify an input value, of a plurality of input values of the first data input, that is associated with the event;
   determining, by the device and using a first model, a probability that the input value corresponds to a feature of the event based on a configuration of the input value;
   classifying, by the device and using the first model, the input value as being associated with an element of the event based on the probability;
   determining, by the device and using the first model, a profiling rule to profile the input value based on the feature and the element;
   profiling, by the device and using the first model, the first data input based on the profiling rule;
   ingesting, by the device and based on a result of profiling the first data input and an ingestion rule determined by the first model, the first data input into a data structure associated with an entity involved in the event, wherein the ingestion rule is associated with utilizing standardizing input values associated with the feature;
   validating, by the device and based on ingesting the first data input, the first data input when a quantity of a plurality of first input values satisfies a threshold quantity,
      wherein the plurality of first input values is a set of input values of the plurality of input values, and
      wherein the set of input values satisfies a validation rule associated with a first entity different than one or more entities associated with the device and the first source device;
   receiving, by the device, a second data input from a second source device associated with the entity, wherein the second source device is different from the first source device;
   performing, by the device and based on validating the first data input, an action associated with the first data input and the entity, wherein the action includes linking a result associated with the first data input with the second data input;
   identifying, by the device and based on the linking, a trend associated with the entity; and
   transmitting, by the device and the identified trend associated with the entity, a notification to at least one of the first source device, the second source device, or an entity device associated with the entity.

2. The method of claim 1, wherein parsing the first data input comprises:
   determining a data format of the first data input based on a characteristic of the first data input; and
   parsing the first data input based on the data format.

3. The method of claim 1, further comprising, prior to determining the probability:
   selecting, based on the configuration, the feature from a plurality of features based on the configuration being mapped to the feature,
      wherein the probability is determined based on the input value and the configuration being mapped to the feature.

4. The method of claim 1, wherein determining the probability comprises:
   using a deep learning by semantic detection model, of the first model, to:
      analyze the configuration of the input value based on text types of the input value;
      determine that the probability corresponds to a highest probability that the feature corresponds to the input value relative to a plurality of other probabilities of other potential features associated with the event; and
      select the probability and the feature as being associated with the input value based on determining that the probability corresponds to the highest probability.

5. The method of claim 1, wherein profiling the first data input comprises:
   determining corresponding probabilities that the plurality of input values correspond to certain features of the element; and
   determining a profile score of the first data input based on the corresponding probabilities.

6. The method of claim 1, wherein the action further includes:
   determining a validation score associated with validating the first data input;
   determining that the validation score satisfies a threshold validation score; and
   updating the first model based on the result of profiling the first data input.

7. The method of claim 6, wherein the action further includes:
   processing, based on the validation score satisfying the threshold validation score, the first data input based on the feature or the element; and providing, via a user interface, a data output corresponding to a result of processing the first data input.

8. A non-transitory computer-readable medium storing instructions, the instructions comprising:
one or more instructions that, when executed by one or more processors of a device, cause the device to:
receive, from a first source device, a first data input that is associated with an event that is associated with the first source device;
parse the first data input to identify an input value, of a plurality of input values of the first data input, that is associated with the event;
determine a probability that the input value corresponds to a feature of the event based on a configuration of the input value;
classify the input value as being associated with an element of the event based on the probability;
determine a rule profile of the input value based on the feature and the element, wherein the rule profile comprises an ingestion rule associated with utilizing standardizing input values associated with the feature;
determine, using a data analysis model, a profile score associated with the first data input based on the feature, the element, and the rule profile,
wherein the data analysis model is trained to validate data inputs based on historical data inputs and historical information associated with features of input values of the historical data inputs; and
ingest, based on the profile score, the first data input into a data structure associated with an entity involved in the event,
validate, based on the ingestion of the first data input, the first data input when a quantity of a plurality of first input values satisfies a threshold quantity,
wherein the plurality of first input values is a set of input values of the plurality of input values, and
wherein the set of input values satisfies a validation rule associated with a first entity different than a second entity associated with the device;
receive a second data input from a second source device associated with the entity, wherein the second source device is different from the first source device;
perform, based on validating the first data input, an action associated with the first data input and the entity, wherein the action includes linking a result associated with the first data input with the second data input;
identify, by the device and based on the linking, a trend associated with the entity; and
transmit, by the device and the identified trend associated with the entity, a notification to at least one of the first source device, the second source device, or an entity device associated with the entity.

9. The non-transitory computer-readable medium of claim 8, wherein the one or more instructions, that cause the one or more processors to parse the first data input, cause the one or more processors to:
determine, using a data resolution model, a data format of the first data input,
wherein the data resolution model is trained to identify various data formats of data inputs, associated with various data sources, based on historical data inputs associated with a variety of configurations of data and the data inputs; and
parse the first data input based on the data format.

10. The non-transitory computer-readable medium of claim 8, wherein the one or more instructions, when executed by the one or more processors, further cause the one or more processors to, prior to causing the one or more processors to determine the probability:
analyze the configuration of the input value based on text types of the input value;
determine that the probability corresponds to a highest probability that the feature corresponds to the input value relative to a plurality of other probabilities of other potential features associated with the event; and
select the probability and the feature as being associated with the input value based on determining that the probability corresponds to the highest probability.

11. The non-transitory computer-readable medium of claim 8, wherein the one or more instructions, that cause the one or more processors to perform the action, cause the one or more processors to:
determine that the profile score satisfies a threshold associated with ingesting the first data input; and
store, based on the profile score satisfying the threshold, the first data input in the data structure associated with the entity involved in the event.

12. The non-transitory computer-readable medium of claim 11, wherein the first data input is validated further based on applying a random factorization analysis to the rule profile and the input value.

13. The non-transitory computer-readable medium of claim 11, wherein the one or more instructions, that cause the one or more processors to perform the action, cause the one or more processors to:
process, according to the rule profile, the first data input based on the feature or the element; and
update the data analysis model or a feature analysis model based on a result of processing the first data input,
wherein the feature analysis model was used to determine the probability.

14. The non-transitory computer-readable medium of claim 11, wherein the one or more instructions, that cause the one or more processors to perform the action, cause the one or more processors to:
process, according to the rule profile, the first data input based on the feature or the element; and
provide, via a user interface, a data output corresponding to a result of processing the first data input.

15. A device, comprising:
one or more memories; and
one or more processors, coupled to the one or more memories, configured to:
receive, from a first source device, a first data input that is associated with an event that is associated with the first source device;
parse the first data input to identify a plurality of input values that are associated with the event;
determine, using a first model, feature information that is associated with elements of the event,
wherein the feature information is trained based on historical input value configurations and historical features that are associated with the historical input value configurations,
wherein the feature information includes a rule profile comprising an ingestion rule associated with utilizing standardizing input values associated with the feature information;
determine, using a second model, a profile score associated with the first data input based on the feature information, wherein the profile score is associated with a quality of the first data input according to the second model, and wherein the second model is trained based on historical data inputs and historical information associated with features of input values of the historical data inputs;

ingest, based on the profile score, the first data input into a data structure associated with an entity involved in the event, validate, based on the ingestion of the first data input, the first data input when a quantity of a plurality of first input values satisfies a threshold quantity, wherein the plurality of first input values is a set of input values of the plurality of input values, and wherein the set of input values satisfies a validation rule associated with a first entity different than another entity associated with the device;

receive a second data input from a second source device associated with the entity, wherein the second source device is different from the first source device;

perform, based on validating the first data input, an action associated with the first data input and the entity, wherein the action includes linking a result associated with the first data input with the second data input;

identify, by the device and based on the linking, a trend associated with the entity; and transmit, by the device and the identified trend associated with the entity, a notification to at least one of the first source device, the second source device, or an entity device associated with the entity.

16. The device of claim 15, wherein the one or more processors, when parsing the first data input, are configured to:

determine, using a third model, a data format of the first data input, wherein the third model is trained to identify various data formats of data inputs, associated with various data sources, based on a variety of historical configurations of the data inputs; and parse the first data input based on the data format.

17. The device of claim 15, wherein the one or more processors, when determining the feature information, are configured to:

cause the first model to use a deep learning by semantic detection analysis to:

analyze configurations of the plurality of input values based on text types within the plurality of input values;

determine, based on the configurations, probabilities that the plurality of input values correspond to particular features of the elements; and generate the feature information based on the probabilities.

18. The device of claim 15, wherein the feature information includes at least one of:

information identifying features that are associated with the plurality of input values of the first data input, information identifying which of the elements are associated with the plurality of input values, or information identifying rule profiles, including the rule profile, for the plurality of input values, wherein the rule profiles are associated with relationships between the features or relationships between the elements of the event.

19. The device of claim 15, wherein the one or more processors are configured to:

determine that the profile score satisfies a threshold associated with ingesting the first data input; and store, based on the profile score satisfying the threshold, the first data input in the data structure associated with the entity involved in the event.

20. The device of claim 19, wherein the one or more processors are further configured to at least one of:

update at least one of the first model or the second model based on a result of processing the first data input, or provide, via a user interface, a data output corresponding to the result of processing the first data input.

* * * * *